(12) United States Patent
Micheletti

(10) Patent No.: US 6,513,514 B1
(45) Date of Patent: Feb. 4, 2003

(54) WIRE SAW FOR CUTTING UP STONE BLOCKS INTO SLABS WITH TENSION ADJUSTMENT OF INDIVIDUAL SAW WIRES

(75) Inventor: Bruno Micheletti, Marina di Carrara-Carrara (IT)

(73) Assignee: Micheletti Macchine S.r.l., Massa Carrera (IT)

(*) Notice: Subject to any disclaimer, the term of this patent is extended or adjusted under 35 U.S.C. 154(b) by 0 days.

(21) Appl. No.: 09/744,213

(22) PCT Filed: Jul. 19, 1999

(86) PCT No.: PCT/EP99/05136
§ 371 (c)(1),
(2), (4) Date: Mar. 7, 2001

(87) PCT Pub. No.: WO00/05021
PCT Pub. Date: Feb. 3, 2000

(30) Foreign Application Priority Data

Jul. 21, 1998 (IT) .................. TO98A000637

(51) Int. Cl.[7] .................. B24D 1/08
(52) U.S. Cl. .................. 125/21; 125/16.02
(58) Field of Search .................. 125/16.01, 16.02, 125/21; 451/296, 311

(56) References Cited

U.S. PATENT DOCUMENTS

| | | | |
|---|---|---|---|
| 2,958,323 A | | 11/1960 | Khoph et al. |
| 3,098,475 A | * | 7/1963 | Knoph et al. .................. 125/21 |
| 5,944,007 A | * | 8/1999 | Miyoshi et al. .................. 125/13.01 |
| 6,095,129 A | * | 8/2000 | Kanemichi et al. .................. 125/16.02 |
| 6,178,962 B1 | * | 1/2001 | Ohashi et al. .................. 125/12 |

FOREIGN PATENT DOCUMENTS

| | | |
|---|---|---|
| FR | 2 633 539 A | 5/1990 |
| IT | 1 245 309 A | 9/1994 |
| JP | 02 124259 A | 5/1990 |
| WO | WO 93/14914 | 8/1993 |

OTHER PUBLICATIONS

"Marmo Macchine"ATTREZZATURE & ACCESSORI VARI, 1998, THE WORLD'S NEWS LEADER FOR MARBLE TECHNOLOGY
Illustrated Catalog distributed by BIDESEIMPIANTI S.N.C.
International Consignment Note–CMR.
Copy of the front–cover and some internal pages of the Jul. –Sep. 1998 Issue of the Italtan magazine p"Marmo Macchine International".

* cited by examiner

Primary Examiner—Joseph J. Hail, III
Assistant Examiner—David B. Thomas
(74) Attorney, Agent, or Firm—Sughrue Mion, PLLC

(57) ABSTRACT

A machine for cutting slabs from a block of stone-like material includes: a fixed support structure; at least two rollers mounted for rotation about their axes at opposite ends of the frame and having a means for translating them vertically, the axes of the rollers being horizontal; at least two cutting wires passing around the rollers in such a way that they lie in respective parallel planes, substantially orthogonal to the axes of the rollers; and means for adjusting the tension of each wire independently of one another.

8 Claims, 2 Drawing Sheets

WIRE SAW FOR CUTTING UP STONE BLOCKS INTO SLABS WITH TENSION ADJUSTMENT OF INDIVIDUAL SAW WIRES

The present invention relates to a machine for cutting slabs from a block of stone-like material. Flat products of any thickness are meant under the term "slab" in the present description.

The object of the invention is to provide a machine of the aforementioned type, operable to cut several slabs from the same block at the same time efficiently, while being of limited dimensions and able to operate safely.

This object is achieved by providing a machine which includes:
- a fixed support frame
- at least two rollers mounted for rotation about their axes at opposite ends of the frame and having means operable to cause them to translate vertically, the axes of the rollers being horizontal,
- at least two cutting wires arranged about the said rollers so as to lie in respective parallel planes, substantially orthogonal to the axes of the rollers, and
- means for adjusting the tension of each wire independently of one another.

Figure 1:
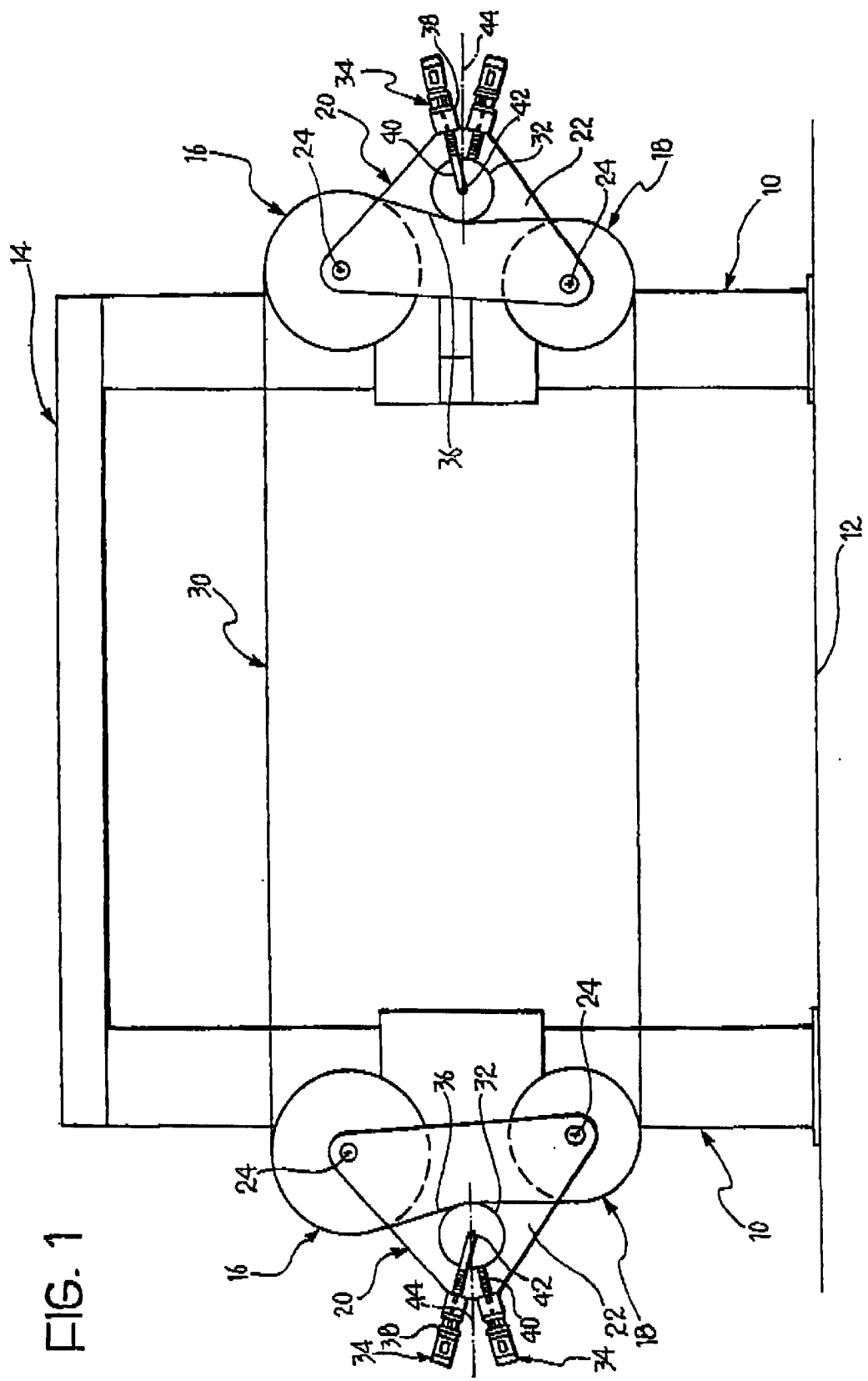

Further advantages and characteristics of the invention will become apparent from the detailed description which follows, provided with reference to the appended drawings, supplied purely by way of non-limitative example, in which:

FIG. 1 a schematic side view of a machine according to the invention, and

Figure 2:
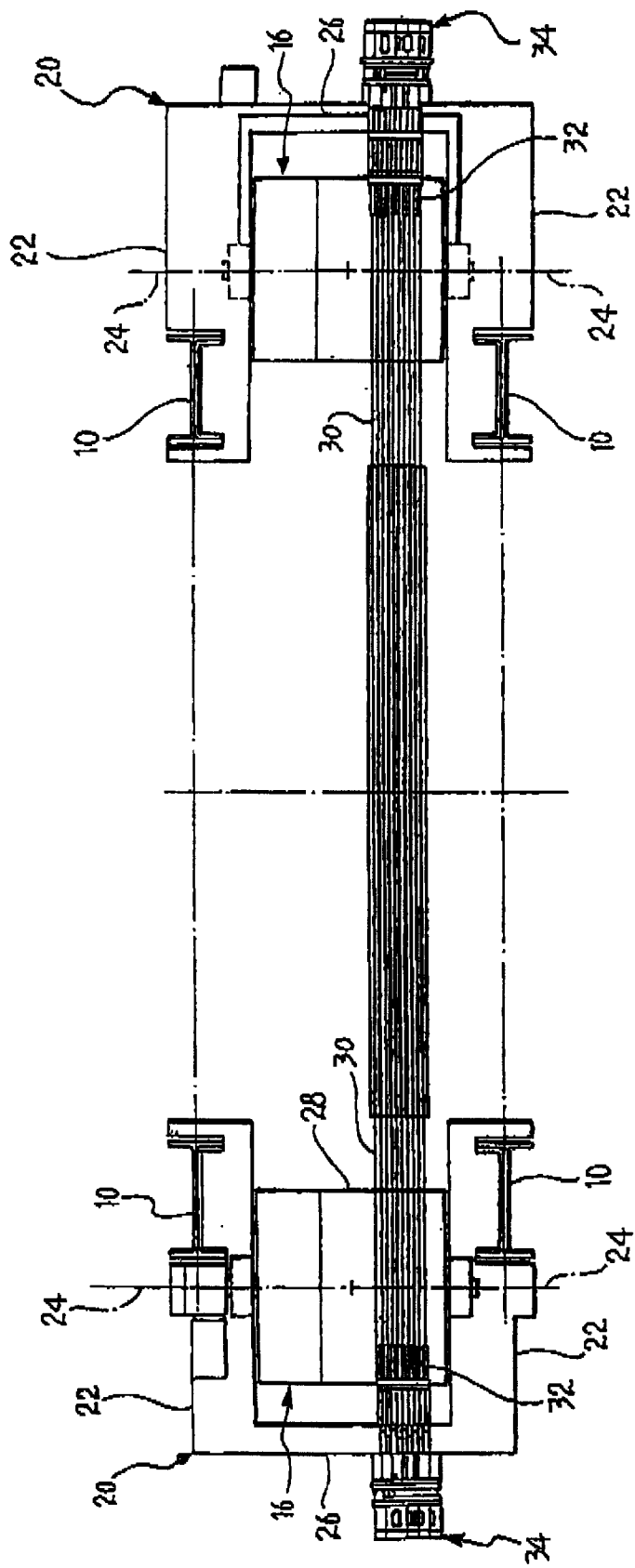

FIG. 2 is a schematic plan view of the machine of FIG. 1.

A machine for cutting slabs from a block of stone-like material includes a fixed support frame made up of four uprights 10, standing on a base 12 at the four corners of a rectangle and connected at the top by a horizontal structure 14.

At each end of the frame, first and second rollers 16, 18 are mounted, spaced one above the other, between respective pairs of uprights 10, so as to form pairs of rollers 16, 18 arranged on the right and on the left respectively in FIG. 1. The rollers 16, 18 of each pair are connected by a respective support structure 20 which includes two side cheeks 22 arranged at either end of the rollers 16, 18 and orthogonal to the axes 24 thereof, and a cross member 26 extending parallel to the axes 24 of the rollers 16, 18 and connecting the side cheeks 22.

The rollers 16, 18 are mounted for rotation about their respective axes 24, which extend horizontally, parallel to each other. The roller 16 of the pair on the right is connected, in a manner known per se not illustrated in the drawings, to a motor operable to rotate it about the axis 24. Once again in known manner and not shown in the drawings, each pair of rollers 16, 18 is provided with means to cause it to translate vertically parallel to the uprights 10, while the pair of rollers 16, 18 on the right also has means operable to translate them horizontally, in order to adjust their position.

A plurality of parallel, circumferential grooves 28 are formed in the outer surface of the rollers 16, 18, regularly spaced along the axes 24.

A plurality of wires 30 for cutting the stone-like material, for example diamond-cutter wires, are arranged around the rollers 16, 18 within the grooves 28, and thus in respective parallel vertical planes, substantially orthogonal to the axes 24 of the rollers 16, 18.

The machine also includes means for adjusting the tension of each wire 30 independently from one another.

For each wire 30, these adjustment means include a unit comprising a pulley 32 and an actuator 34 which is, for example, electrically, hydraulically or pneumatically operated.

The pulley 32 rests against the portion 36 of the wire 30 between the first roller 16 and the second roller 18 of one of the pairs of rollers 16, 18. The actuator 34 has an operating cylinder 38, slidably mounted on the cross member 26 of one of the support structures 20, and a piston 40, the distal end 42 of which is pivoted to the pulley 32 at its axis and is thus able to urge the latter against the portion 36 of the wire 30.

In order to make better use of the available space, the units for adjusting the tension of adjacent wires 30 are arranged alternately at one end or the other of the machine, in a staggered configuration. In addition, the cylinders 38 of the pistons 34 of the means for adjusting the tension of the wires 30, which are arranged at the same end of the machine and slidably mounted on the same cross member 26, are alternately staggered vertically with respect to a horizontal plane 44.

In order to cut slabs from a block of stone-like material (not illustrated in the drawings) which is arranged between the uprights 10, on the base 12, the following procedure should be followed.

Once the number and thickness of the slabs to be cut has been established, the required number of cutter wires 30 are arranged in grooves 28 in the rollers 16, 18, spaced by a distance equal to the desired thickness. The drawings show ten wires 30 arranged equally spaced at one end of the rollers 16, 18, but it is clear that a different number of differently spaced wires 30 could be used, in dependence on the specific cutting requirements.

The tension of the wires 30, initially loosely arranged around the rollers 16, 18, is then adjusted by moving the rollers 16, 18 of the right-hand pair horizontally until at least one of the wires 30 is tensioned.

Typically, the fact that one of the wires 30 is tensioned does not mean that the others are subjected to the same tension—given their different geometric and structural characteristics—which constitutes the ideal operating condition of the machine.

To get to this condition the adjustment units formed by the pulleys 32 and actuators 34 are positioned axially along the cross members 26 in line with the respective wires 30. Then, the piston 40 of each unit is controlled to perform an excursion, thereby causing the pulley 32 progressively to press against the portion 36 of the wire 30 until the latter is subjected to the desired common value of the tension.

Once this operation has been carried out for each wire 30, the machine is ready to cut the block of stone-like material, in a way substantially like that employed by prior art machines with a single wire. Cutting is achieved in this machine, as in prior art machines, by a combined movement of the wires 30 which rotate with the rollers 16, 18 when the motorized roller 16 is activated and, at the same time, move downward with the downward movement of the rollers 16, 18 parallel to the uprights 10.

At the end of this movement the block has been cut into a series of slabs—one more than the number of wires 30, and of a thickness equivalent to the spacing between the wires 30—with a high degree of accuracy due to the equalization of the tension in the various wires 30. This equalization is maintained throughout the entire cutting operation thanks to the possibility of adjusting the tension of each wire 30 individually, in order to compensate for any variation from the desired tension, which could occur also during cutting.

Naturally, the principle of the invention remaining unchanged, the manufacturing details and embodiments may vary widely from those described purely by way of non-limitative example, without departing thereby from the scope of the invention.

For example, the tensioning pulleys 32 can be arranged either outside the space delimited by the wires 30—as shown in the drawings—or inside. In the latter case, tension on the wires is increased by moving the pulleys outwardly of the machine, rather than inwardly as illustrated in the drawings.

What is claimed is:

1. A machine for cutting slabs from a block of stone-like material, which includes:

a fixed support frame at least two rollers (16) mounted for rotation about their axis (24) at opposite ends of the frame and having means for translating them in a vertical direction, the axes (24) of the rollers (16) being arranged horizontally, at least two cutter wires (30) passing around the said rollers (16) in such a way that they lie in respective parallel planes, substantially perpendicular to the axis (24) of the rollers (16), and means for adjusting the tension of each wire (30) independently of the others, said machine being characterised in that a plurality of circumferential grooves 928) are formed in the outer surfaces of the rollers (16, 18), spaced along the direction of the axes (24) of the rollers (16, 18) each groove (28) being able to house a respective wire (30), and in that said means for adjusting the tension of each wire (30) act directly on a portion (36) of the wire (30).

2. A machine according to claim 1, which includes first and second spaced rollers (16, 18) arranged one above the other, at each end of the frame, so as to form respective pairs of rollers (16, 18) which can move together vertically, the said means for adjusting the tension in the wires (30) being capable of acting on the portion (36) of the wires (30) between the first (16) and second (18) roller of at least one of the pairs of rollers (16, 18).

3. A machine according to claim 2, in which the said means for adjusting each wire 930), a unit comprising a pulley (32) bearing against the portion (36) of the wire (30) located between the first roller (16) and the second roller (18) of one of the pairs of rollers (16, 18) and means for pressing the pulley (32) against the said portion (36) of wire (30).

4. A machine according to claim 3, in which the said means for pressing the pulley (32) against the portion (36) of wire (30) comprise an actuator (34) having an operating cylinder (38) and a piston (40), the distal end of which is pivoted on the pulley (42) at the axis thereof.

5. A machine according to claim 1, in which the means for adjusting the tension of adjacent wires (30) are arranged alternately at opposite ends of the machine, in a staggered configuration.

6. A machine according to claim 2, in which the means for adjusting the tension of the wires (30) are held by support structures (20) secured to each pair of rollers (16, 18).

7. A machine according to claim 6, in which each of the said support structures (20) includes two side cheeks (22) arranged at respective ends of the rollers (16, 18), orthogonal to the axes (24) of the latter, and a cross member (26) extending parallel to the axes (24) of the rollers (16, 18), connecting the side cheeks (22) and on which the said adjustment means are slidably mounted.

8. A machine according to claim 7, in which the cylinders (38) of the actuators (34) of the means for adjusting the tension of the wires (30) associated with the same support structure (20) are alternately staggered vertically with respect to a horizontal plane (44).

* * * * *